March 23, 1965  W. H. A. WEBB ETAL  3,174,911
FORMALDEHYDE MANUFACTURE

Filed March 9, 1961  2 Sheets-Sheet 1

Inventors
William H. A. Webb
Herbert C. Gull
By
Kenyon, Palmer, Stewart & Estabrook
Attorneys March 23, 1965 W. H. A. WEBB ETAL 3,174,911
FORMALDEHYDE MANUFACTURE Filed March 9, 1961 2 Sheets-Sheet 2

Inventors
William H. A. Webb
Herbert C. Gull
By
Kenyon, Palmer, Stewart & Estabrook
Attorneys

United States Patent Office 3,174,911
Patented Mar. 23, 1965

3,174,911
FORMALDEHYDE MANUFACTURE
William H. A. Webb and Herbert C. Gull, Rochester,
Kent, England, assignors to Burnett and Rolfe Limited
Filed Mar. 9, 1961, Ser. No. 94,507
7 Claims. (Cl. 202—40)

In the manufacture of formaldehyde, it is common practice to pass methanol vapour together with a carefully regulated proportion of air over a catalyst in a reactor. The catalysts employed are in the main of two types that is to say "dehydrogenation catalysts" such as silver and copper and "oxidation" catalysts such as iron and molybdenum oxide. The present invention is concerned with processes in which the first type of catalyst is employed.

The proportions of air and methanol, the temperature of the preheat, the temperature of the catalyst and similar variables have all been the objects of study with a view to determining the optimum conditions of operation so as to obtain a high percentage conversion of methanol (which is a measure of the fraction of methanol which is actually attacked) and a high percentage yield of formaldehyde (which is a measure of the fraction of the methanol attacked which is actually converted into formaldehyde).

In one particular process for making formaldehyde, high conversion and yield figures are obtained by adding water vapour as a diluent to the air-methanol mixture prior to its passage over the catalyst. The vapours leaving the reactor are condensed to give a resultant mixture containing up to about 37% formaldehyde and with 4 to 7% methanol, this mixture having hitherto been a marketable product. However, customer's requirements are becoming more onerous and a mixture is now required having a rather greater percentage of formaldehyde, for example 44% or more, and with rather less methanol, for example less than 1½% or 1%. Such a mixture has been obtained from the product of the particular process just referred to, but this has involved costly processes since the product has to be re-distilled.

According to the present invention, the mixture of methanol and formaldehyde derived from the reactor, instead of being condensed as hitherto, is subjected to a following fractionating operation employed to separate methanol and formaldehyde and the heat in the mixture derived from the reactor is used as an aid in this fractionating operation. In a process according to the invention, the heat, both sensible and latent, is not wasted as hitherto by condensing the mixture derived from the reactor but instead is usefully employed in the fractionating operation, in which operation the percentages of formaldehyde and methanol in the product obtained may respectively be increased and decreased. For example the product of the fractionating operation may easily have more than 41% formaldehyde and less than 4% methanol. If desired some of the heat in the mixture derived from the reactor may be taken off by means of a heat exchanger prior to the mixture being passed on for the fractionating operation. As a result of this, the mixture arriving at the column in which fractionation is to take place has a temperature lower than that in the mixture derived directly from the reactor, the former temperature preferably being substantially 150° C. The heat in the mixture arriving at the fractionating column may be sufficient to produce a reflux ratio of approximately 20 to 1 at the top of the column and this may be increased to approximately 30 to 1 if desired by applying extra heat to the bottom of the column. It will be appreciated that in this particular case approximately two thirds of the total heat required to operate the column is obtained from the heat in the mixture itself.

A further advantage of a process according to the present invention is that it readily permits the formation of substantial quantities of solid paraformaldehyde to be avoided, since the greater proportion of the formaldehyde solution need never get cold and indeed, as will be described later, cooling may be applied deliberately only to solutions which contain virtually no formaldehyde at all. All this can be contrasted with prior processes in which the vapours derived from the reactor were completely condensed as quickly as possible using heat exchangers and cooling pipes cooled with cold water, with the result that, unless care were taken, large quantities of solid paraformaldehyde were likely to form.

In order to effect satisfactory fractionation and resultant separation of mehanol and formaldehyde, we have found that particular attention should be paid to a number of important factors which will now be indicated.

In the first place, it is preferred that the fractionation take place in a column of the bubbling plate type. Such a column depends for its satisfactory working upon the establishment of a substantial measure of equilibrium on each plate between the condensed liquid passing from plate to plate down the column and the vapours passing up the column. In a system comprising the vapours of methanol, water and formaldehyde and their liquid condensation products the establishment of equilibrium between the liquid and vapour phases involves not only the condensation of water and methanol vapours to liquid form together with the solution therein of formaldehyde, but it also involves a reaction in the liquid phase between dissolved formaldehyde, liquid water and liquid methanol to give complicated and much less volatile compounds. We have found by practical experience that the liquid descending the column to the point at which the mixture of formaldehyde and methanol is introduced into the column should take a long time to pass over a plate since it is only by having a long liquid hold-up time that the complex reactions indicated above are given sufficient time to take place. Generally speaking a time of over a minute is required, although four minutes may sometimes be appropriate. Such times, which are the average time for liquid to pass over a plate, are readily found by experiment.

Secondly, it is highly desirable that the fractionation take place in the presence of a substantial volume of gas which is, by definition, non-condensable. Preferably this volume is such that the total partial pressure of the vapours is kept below 550 mm. of mercury, varying, for example, from 450 mm. of mercury for vapours just about to start fractionation to just under 550 mm. of mercury for vapours at the end of the operation, these figures referring to a total pressure of about 760 mm. The presence of the permanent gas serves to permit fractionation to occur at a lower temperature and thereby facilitates the concentration of the formalin solution.

The fractionating operation is also preferably carried out in a column at the top of which the methanol concentration is maintained substantially above 20% by weight, and preferably above 80% by weight. The presence of a high concentration of methanol serves to reduce the relative volatility of formaldehyde with respect to water over a large range of concentrations and temperatures and thus serves to reduce the amount of formaldehyde leaving the top of the fractionating column.

The high concentration of methanol may be obtained in one or both of two different ways. In the first place, it may be obtained with the aid of a cooling device which condenses methanol at the top of the column and thereby ensures that the amount of methanol vapour carried away from the top of the fractionating column balances the net inflow into the column. The top of the column may, for example, be provided with a dephlegmator which cools the stream of vapour and gas passing out from the top of the column, thereby condensing some of the methanol and water vapours to liquid, which flows back onto the top plate of the column as reflux. As an alternative, or in addition, the high concentration of methanol may be obtained with the aid of liquid methanol added to the top of the fractionating column and this method may be found of particular use in tropical countries where the temperature of cooling water for use in the cooling device is not sufficiently low to make the first method efficient.

The liquid passing down the column and overflowing from the point of the column at which the mixture of formaldehyde and methanol is introduced includes more methanol than is desired (for it may include between 2 and 4% methanol) and as a consequence it is preferred that the fractionation be effected in a column having an extension below the point at which the said mixture is introduced into the column, methanol being progressively removed from the downwardly flowing liquid in this extension. In order to effect such removal the plates in this extension are constructed to give as short a hold-up time as possible. By contrast with what happens in the fractionating column above the point of entry of the mixture, the bulk of the formaldehyde is now in solution in the form of comparatively nonvolatile compounds which will take time to turn again to free formaldehyde and it is desired to remove the methanol from solution as fast as possible and keep the evaporation of formaldehyde to a minimum, and for this purpose a short hold-up time is necessary. Heat is preferably applied at the bottom of the extension to effect the removal of the methanol. The product obtained from the extension may easily have more than 42% formaldehyde and may indeed have more than 44%, whilst the methanol content may be less than 1½% and as little as 1%.

Preferably, after fractionation, sufficient water is added to unconverted methanol to absorb substantially all this methanol, the resultant mixture of methanol and water then being heated to provide a vaporous mixture of methanol and water vapour which is passed over the catalyst to produce more formaldehyde. Preferably this heating of the mixture of methanol and water is effected in a fractionating column to which steam is admitted, the liquid mixture descending the column and having substantially the whole of the methanol removed from it by evaporation by ascending steam, so that substantially all the methanol becomes available for passage as a vapour over the catalyst, whilst sufficient steam is admitted to ensure that the methanol vapour is accompanied by enough water vapour to provide substantially equimolecular proportions of methanol and water vapour at the catalyst.

Apparatus according to the present invention comprises a reactor for effecting conversion in the presence of a dehydrogenation catalyst and water vapour of methanol into formaldehyde to provide a mixture of methanol and formaldehyde, and a fractionating column of the bubbling plate type connected to the reactor to receive the mixture for fractionation, the plates being of a novel construction such as to give a long liquid hold-up time.

With prior bubbling plates, the bubble hoods (which may be either in the form of bubble caps or bubble tunnels) are so arranged that the bubbles appear at positions which, when taken in toto occupy substantially the whole of the space available on the plate for liquid: substantially all of the liquid on a plate is reached by the bubbles even if the liquid is kept perfectly still. In practice, however, the liquid flows over the plate and takes only a matter of seconds to do so. By contrast, a plate according to the present invention is provided with a liquid reservoir space which is disposed away from the positions at which the bubbles appear, and the plate is also provided with means for causing circulation of liquid to bring liquid in the liquid reservoir space into the positions at which the bubbles appear. By providing a liquid reservoir space, the time taken for liquid to pass over the plate may be increased without a corresponding drop in the speed at which the liquid flows. In addition, however, the circulating means is provided to ensure that liquid does not stay in the reservoir space where it is out of the reach of the bubbles.

In one particular construction of plate according to the invention, the plate is in the form of two separate containers for liquid disposed one above the other and with the bubble hoods provided only in the topmost container, the passages for the gas extending downwardly from the upper container and right through the lower. With such a construction, the bubbles appear only in the upper container and the lower container constitutes the liquid reservoir space. With this particular plate, pumps are provided to pump liquid from this reservoir space upwardly into the upper container.

In a more convenient construction, the bubbling plate is in the form of a single container for liquid, with the liquid reservoir space at the bottom of the container and the positions at which the bubbles appear at the top. Such a bubbling plate may have a depth of between 10 and 14 inches, the bottom few inches constituting the liquid reservoir space.

The circulating means may, for example, comprise a number of passages which extend downwardly from the region between the bubble hoods of the plate to promote downward flow of liquid through the passages and consequential movement of liquid from the reservoir space into the positions at which the bubbles appear. When the plates are of the bubble cap type, such passages may be formed by vertically extending tubes, whilst when the plates are of the bubble tunnel type (the hoods being elongated) the passages may be formed by vertical parallel sheets which are parallel to the tunnels themselves. It is important to ensure that, with such deep trays, the bubbles themselves do not have to pass through too great a height of liquid since this would necessitate the application of an unduly high pressure to effect bubbling at all, and as a consequence when the hoods have serrated edges it is preferred that these edges extend only a fraction of the way towards the bottom of the plate.

A process, apparatus and a plate according to the invention will now be described by way of example, with reference to the accompanying drawings in which.

Figure 1:
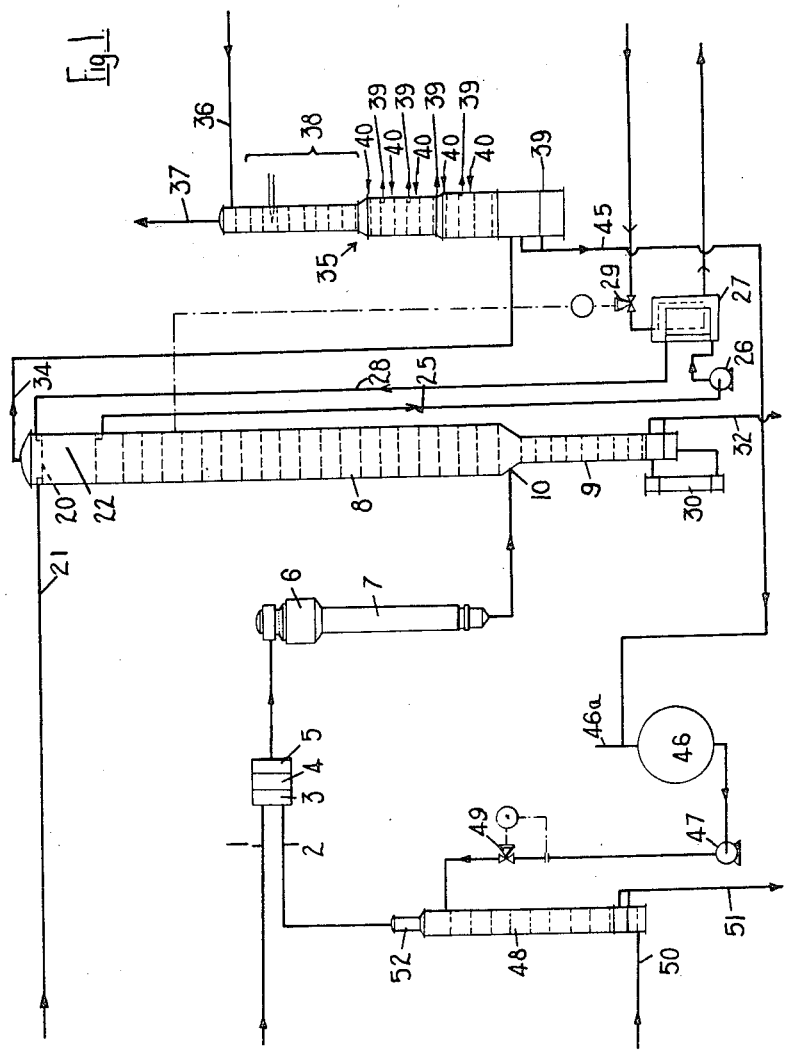
FIGURE 1 is a diagrammatic picture showing the manufacture of formaldehyde.

Referring first of all to FIGURE 1, air is passed through a pipe 1, and methanol and water vapour through a pipe 2 into a mixer 3, from which the mixture passes to a super heater 4 and through a flame trap 5 and is then passed into a conventional reactor 6 where the mixture passes over a silver catalyst. Much of the methanol is converted into formaldehyde and some of the hydrogen produced is burnt to form water. Some of the heat thereby produced is removed by a heat exchanger in the form of a waste heat boiler 7. The mixture is then passed, at a temperature of 150° C., into a fractionating column 8 having an extension 9 below the point 10 at which the mixture is introduced. The column 8 contains some twenty similar bubble cap type plates, one being shown in detail in FIGURES 2 and 3. By virtue of their constuction, to be described later, the liquid flowing down the column 8 has a long average hold-up time at each plate, this hold-up time being between one and ten minutes or possibly even more than ten minutes, so that the necessary action can take place at each plate. It will be appreciated that the fractionation in the column 8 takes place in the presence of substantial volumes of gas since nitrogen from the air passed into the mixer 3, as well as hydrogen from the reactor 6 pass later into the column 8.

A high concentration of methanol is maintained on the top plate. This could be done by employing a conventional dephlegmator, but as illustrated the high concentration of methanol is provided by employing an arrangement, indicated at 22, in the form of Raschig rings over which flows a cooled liquid containing 20–95% methanol. This liquid flows down from the top plate, shown at 20, to the next plate from which it is withdrawn by a pipe 25 and passed by means of a pump 26 to a cooling device in the form of a plate type heat exchanger 27, which returns cooled liquid to the top of the column through a pipe 28. The amount of heat removed may be adjusted by a temperature controller 29 which itself is controlled by the temperature of liquid at or near the top of the column so that if this temperature rises, more cooling water is allowed to enter the exchanger 27 so as to remove more heat from the liquid in the column 8.

The methanol concentration at the top of the column 8 may be kept high solely by the cooling device 27 if cooling water is available which permits the temperature at the top of the column to be kept at about 25° C. If this is not practicable, however, the temperature of the gases and vapours leaving the top of the column may be kept at some other convenient temperature, for example about 40° C., in which case the quantity of methanol leaving the column with the gases will be quite large and there will be a corresponding deficiency in reflux. This deficiency can be remedied by adding the correct amount of methanol to the top plate and this can be done by passing methanol through a pipe 21. In the illustrated process, the only methanol passed into the whole system is that passing through the pipe 21.

The extension 9 is of smaller diameter than the column 8 and has only some nine plates, each having a short hold-up time. The bottom of the extension 9 is heated by a heater 30 in the form of a calandria so that methanol is progressively stripped from the downwardly descending liquid so that the liquid at the bottom of the extension 9 contains only some 1% of methanol.

In one particular example, the mixture fed into the column 8 in an hour comprises 163 lbs. of methanol, rather more than 820 lbs. of formaldehyde, 1026 lbs. of water and 1430 lbs. of gas. Liquid methanol at the rate of 1014 lbs. per hour is fed into the column 8 through the inlet 21 and the mixture overflowing from the bottom plate of the column 8 comprises between 41 to 45% by weight of formaldehyde, between 2 and 4% of methanol and between 51 and 58% of water. The mixture obtained in an hour from the bottom of the extension 9, through a pipe 32 comprises 820 lbs. of formaldehyde, 19 lbs. of methanol, and 1026 lbs. of water, this mixture being at a temperature of some 105° C. Steam is fed into the calandria 30 at the rate of 820 lbs. per hour, and the cooling device 27 removes 2,215,000 B.t.u. per hour, that is to say 1190 B.t.u. per lb. of 44% formalin produced. The mixture of vapours and gases obtained at the top of the column, through a pipe 34, comprises 1158 lbs. of methanol, 1430 lbs. of gas, less than 33 lbs. of formaldehyde, and a negligible amount of water, the mixture being at a temperature of some 40° C.

The mixture from the top of the column 8 is then fed into an absorption column 35 into which sufficient scrubbing water is fed, through a pipe 36, to absorb substantially all the unconverted methanol, that is to say methanol which has passed through the reactor 6 and not been converted, and methanol which has been passed through the pipe 21. It will be appreciated that a large amount of water is required for this absorption because of the large amount of methanol passed into the system through the pipe 21. The gases are obtained from the column 35 through a pipe 37. The plates 38 at the top of the column 35 are cooled. Whilst liquid at the plates lower down is withdrawn, cooled by a plate type heat exchanger (not shown) and then returned to the column 35, the pipes for the withdrawal and return of the liquid being shown at 39 and 40 respectively.

The resultant mixture of methanol and water obtained at the bottom of the column 35 is passed through a pipe 45 to a tank 46. If the pipe 21 is dispensed with, as may be the case when sufficiently cold cooling water is available for the device 27, the methanol for the whole system be introduced into the system by feeding it into this tank 46 through a pipe 46a.

Methanol and water, passed into the tank 46 via the pipe 45, is then pumped by a pump 17 into the evaporating column 48 comprising a number of bubble plates, indicated by dotted lines, the rate of flow being controlled by a controller 49. With the particular figures mentioned above, the liquid mixture fed into the column 48 is made up of 1156 lbs. of methanol per hour and 1200 lbs. of water per hour, entering the column 48 at a temperature of approximately 40° C. The column 48 is fed with steam through a pipe 50 at the rate of 1280 lbs. per hour, this steam being injected directly into the column so that steam bubbles up through the plates in sequence through the downwardly descending liquid. Since vapour in equilibrium with a liquid containing methanol and water is always richer in methanol than the liquid it will be appreciated that provided sufficient plates are provided in the column and provided a sufficient amount of heat is applied, the liquid flowing from the bottom of the column may contain substantially no methanol at all. Indeed, with the figures mentioned above, there would be of the order of between 0.01% or .18 lbs. per hour of methanol in the liquid flowing away from the column 48 through a pipe 51, the major part of the liquid being made up of 1880 lbs. per hour of effluent water, itself made up of 1280 lbs. per hour of condensed steam and 600 lbs. per hour of water from the tank 46. Provided that there are sufficient plates in the column and provided that the right amount of steam is fed into the column, the composition of the liquid mixture fed into the column from the tank 46 may vary considerably whilst still producing at the top of the column a substantially equimolecular mixture of methanol and water vapour such as is desirable for passage into the reactor 6. Actually, not exactly equimolecular proportions of methanol and water are desired since allowance must be made for the fact that some water enters the system with the air through the pipe 1. With the particular process being described, the vapours derived from the top of the column 48 comprise 1156 lbs. per hour of methanol and 600 lbs. per hour of water which works out at about 66% of methanol, as compared with the 64% of methanol which would be required to give exactly equimolecular proportions of methanol and water. The mixture of methanol and water is then passed through a conventional device 52 for removing droplets and then enters the pipe 2 for the process already described.

Figure 2:
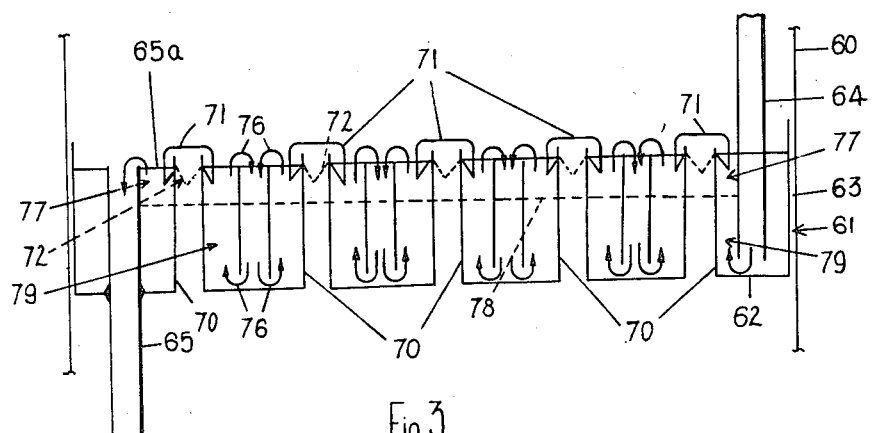
FIGURE 2 is an elevation of one plate according to the invention.
Figure 3:
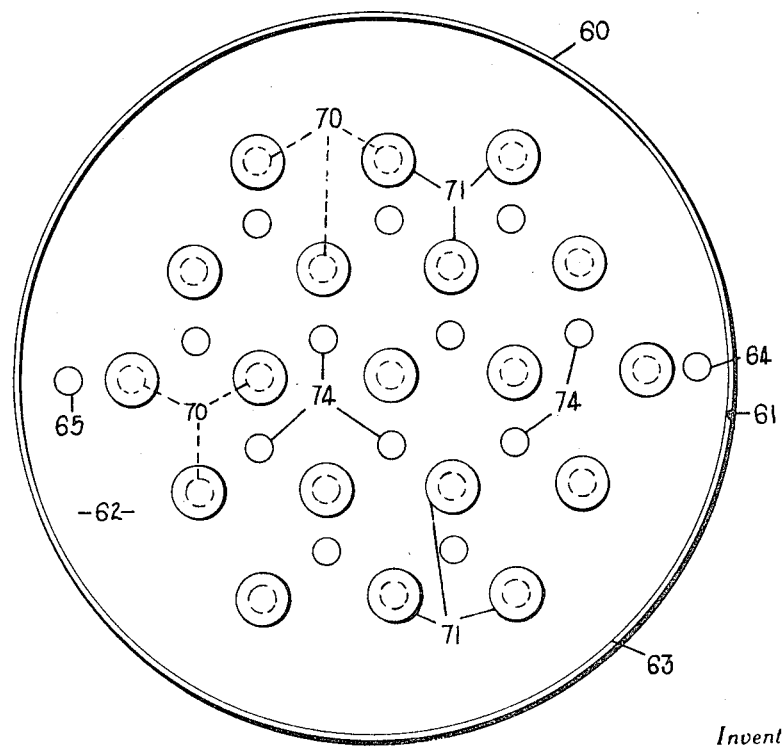
FIGURE 3 is a plan of this plate.

As already indicated, the plates employed in the column 8 are of novel construction and one is shown in detail in FIGURES 2 and 3. In these figures, the wall of the column 8 is shown at 60 and the plate is in the form of deep tray 61 constituting a single container for liquid, having a bottom 62 and a cylindrical upstanding wall 63 secured to the wall 60. Liquid reaches the plate 61 through a tube 64 and leaves it through a tube 65. It will be appreciated that the capacity of the plate 61 depends upon its depth, that is to say the distance between the bottom 62 of the plate and the top end of the tube 65, this top end defining the level, indicated at 65a, taken by liquid when still.

Upwardly flowing gas reaches the plate through a number of tall tubes 70, each surmounted by a bubble hood in the form of a cap 71 having a serrated edge 72 which extends only a fraction of the way towards the bottom 62 of the plate, the top of the serrations being only about ¾ inch below the liquid level 65a. In this way, the overall pressure drop through the whole column 8 can be kept to a reasonably low figure.

When bubbles appear from the caps 71, they occupy substantially the whole of the top part of the plate, the bubbles appearing therefore at positions defined by the arrows 77, positions which all lie above a plane indicated by the dotted line 78. Below this line 78 and thus disposed away from the positions at which the bubbles appear is a liquid reservoir space 79. By virtue of this space 79 the time taken on average for liquid to flow from the tube 64 to the tube 65 may be substantially increased without the need for reducing the speed of the liquid. The presence of this space necessitates the presence of tubes 70 which are taller than hitherto so as to carry the caps 71 at the liquid level. In addition to this, however, means is provided for causing circulation of liquid to bring liquid in the space 79 into the space 77 for reaction there with the bubbles. This circulating means is in the form of a number of passages formed by tubes 74 which are disposed in a symmetrical fashion, as shown in FIGURE 3, between the different tubes 70. The tubes 74 have their top rims level with the normal liquid level 65a and their lower ends are supported by means (which is not shown) so that they are at a distance from the bottom 62 equal to approximately a quarter of their diameter. The action of the tubes 74 depends upon the head of froth which is continuously generated by gas and vapour emerging from the serrations 72 and which collects and collapses in the comparatively calm areas over the upper ends of these tubes 74. As a result of this head of froth, liquid flows down the tubes 74 and then up again outside them as indicated by the arrows 76.

It will be appreciated that instead of having bubble cap trays the column 8 may be provided instead with bubble tunnel plates where the caps 71 are in the form of long tunnels, the tubes 74 then being replaced by vertical parallel sheets parallel to the tunnels and serving the same purpose as these tubes.

In the plate shown in FIGURES 2 and 3, there is virtually a 1:1 ratio between the number of tubes 70 and the number of tubes 74, but this is by no means essential if desired, for example, alternate rows of tubes 74 may be omitted so that the ratio referred to becomes 2:1, each tube 74 thus dealing on average with two bubble caps. In yet a further modification, with the same ratio of 2:1, the tubes 70 are arranged not on a regular triangular pattern as shown in FIGURE 3, but in a regular hexagonal pattern, with a tube 74 at the centre of each hexagon. It will be appreciated that in practice many more tubes 70 than are shown in FIGURES 2 and 3 may be employed so as to give a fractionating column of reasonably high capacity.

We claim:

1. A process for the production of an aqueous formaldehyde solution containing at least about 42% by weight of formaldehyde and less than about 4% by weight of methanol by the catalytic conversion of methanol which comprises:

(a) fractionating in a single elongated separation zone a reaction mixture issuing heated from the catalytic conversion of methanol to formaldehyde into a distillate stream comprising predominately methanol and non-condensable gases and a residue stream comprising at least 42% by weight of formaldehyde, less than 4% by weight of methanol and water, (b) introducing said hot reaction mixture into said separation zone at a point intermediate the ends thereof, (c) causing the liquid passing downwardly in said separation zone to be divided into a plurality of superposed separate portions with the portions above said point of introduction being substantially larger in volume than the portions below said point, (d) retaining downwardly passing liquid in each of said larger volume portions for at least about one minute dwell time, and (e) regulating the methanol content in the top liquid portion of said separation zone to maintain a methanol concentration of at least about 20% by weight of said liquid portion.

2. A process as defined in claim 1 in which an amount of liquid methanol is introduced at the top of said separation zone sufficient to maintain a concentration of from about 20 to 80% by weight of methanol at the top of said zone.

3. A process for the production of an aqueous formaldehyde solution containing at least about 42% by weight of formaldehyde and less than about 4% by weight of methanol by the catalytic conversion of methanol, which comprises:

(a) fractionating in a single elongated separation zone a reaction mixture issuing heated to a temperature about 150° C. from the catalytic conversion of methanol to formaldehyde into:

a distillate stream comprising predominately methanol and non-condensible gases, and a residue stream comprising at least 42% by weight of formaldehyde, less than 4% by weight of methanol and water, (b) introducing said hot reaction mixture into said separation zone at a point intermediate the ends thereof, (c) causing the liquid passing downwardly in said separation zone to be divided into a plurality of suporposed separate portions with the portions above said point of introduction being substantially larger in volume than the portions below said point, (d) retaining downwardly passing liquid in each of said larger volume portions for at least about one minute dwell time, (e) regulating the methanol content in the top liquid portion of said separation zone to maintain a methanol concentration of at least about 20% by weight of said liquid portion, (f) removing methanol vapor in a stream of permanent gases from the top of said separation zone at a rate substantially equal to the rate at which methanol and said permanent gases are introduced into said separation zone in step (b), (g) contacting water with the methanol vapor stream obtained in step (f) to form a mixture of methanol and water, and (h) utilizing the methanol and water mixture obtained in step (g) as feed for the catalytic conversion of methanol to formaldehyde.

4. A process as claimed in claim 1 in which said separation zone is maintained at a pressure below 550 mm. of mercury.

5. A process as claimed in claim 1 in which said methanol concentration in step (e) is above 80% by weight.

6. A process as claimed in claim 1 in which said concentration is maintained by addition of liquid methanol to the top of said separation zone.

7. A process as claimed in claim 1 in which methanol vapor is carried away from the top of said separation zone at a rate substantially equal to the rate of introduction of methanol into said zone in step (b).

References Cited by the Examiner

UNITED STATES PATENTS

| | | | |
|---|---|---|---|
| 2,204,652 | 6/40 | Bludworth | 260—603 |
| 2,549,290 | 4/51 | Congdon et al. | 202—67 |
| 2,565,569 | 8/51 | McCants | 202—71 X |
| 2,798,033 | 7/57 | Lloyd | 202—52 X |
| 2,849,493 | 8/58 | Shelton et al. | 260—603 |
| 2,863,737 | 12/58 | Green | 23—263 |
| 2,908,715 | 10/59 | Eguchi | 260—603 X |
| 2,929,690 | 3/60 | Bennett et al. | 23—263 |

NORMAN YUDKOFF, *Primary Examiner.*

CHARLES B. PARKER, LEON ZITVER, *Examiners.*